US006529672B1

(12) United States Patent
Blondel et al.

(10) Patent No.: US 6,529,672 B1
(45) Date of Patent: Mar. 4, 2003

(54) ELIMINATION OF OPTICAL POWER LIMITATION DUE TO STIMULATED RAMAN SCATTERING IN FIBER OPTIC LINKS

(75) Inventors: Jean-Pierre Blondel, Buc (FR); Eric Brandon, Bourg la Reine (FR); Jean-François Marcerou, Corbeil-Essonnes (FR); Mireille Marcerou, Corbeil-Essonnes (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/228,683

(22) Filed: Jan. 12, 1999

(30) Foreign Application Priority Data

Jan. 15, 1998 (FR) .............................. 98 00350

(51) Int. Cl.⁷ .............................................. G02B 6/26
(52) U.S. Cl. ..................... 385/140; 385/15; 359/334; 372/3
(58) Field of Search ................ 385/140, 15, 31–47, 385/141–145; 359/334, 326; 372/3, 6

(56) References Cited

U.S. PATENT DOCUMENTS

| 4,786,140 A | * 11/1988 | Melman et al. ................. 385/5 |
| 5,323,404 A | * 6/1994 | Grubb .............................. 372/6 |
| 5,815,518 A | * 9/1998 | Reed et al. ...................... 372/6 |
| 5,892,615 A | * 4/1999 | Grubb et al. ................. 359/341 |
| 6,088,152 A | * 7/2000 | Berger et al. ................ 359/334 |
| 6,115,174 A | * 9/2000 | Grubb et al. ................. 359/334 |
| 6,122,298 A | * 9/2000 | Kerfoot, III et al. ............ 372/6 |

OTHER PUBLICATIONS

S. G. Grubb et al, "Fiber Raman lasers Emit At Many Wavelengths", Laser Focus World, vol. 32, No. 2, Feb. 1, 1996, p. 127, 130/131, 134 XP000554804.
B. Foley et al, "Gain Saturation in Fiber Raman Amplifiers Due to Stimulated Brillouin Scattering", Journal of Lightwave Technology, vol. 7, No. 12, Dec. 1, 1989, pp. 2024–2032, XP000103648.
P. B. Hansen et al, "Unrepeatered WDM Transmission Experiment with 8 Channels of 10 GB/Sover 352 KM", IEEE Photonics Technology Letters, vol. 8, No. 8, Aug. 1, 1996, pp. 1082–1084.

* cited by examiner

*Primary Examiner*—John D. Lee
*Assistant Examiner*—Juliana K. Kang
(74) *Attorney, Agent, or Firm*—Sughrue Mion, PLLC

(57) ABSTRACT

In a fiber optic link signal or pump sending power limitations due to stimulated Raman scattering are pushed back by using attenuation in the Raman gain region. Various techniques are proposed for limiting stimulated Raman scattering. In particular, the use of optical fiber lightly doped with dysprosium, the attenuation of which increases rapidly beyond 1 500 nm, is proposed. The use of this fiber to transport pump power at 1 480 nm towards remote amplifiers would enable injection of pump power up to an order of magnitude of 10 W, whereas the limit is currently 1.3 W. This technique would enable the range of links to be increased approximately 80 km.

33 Claims, 2 Drawing Sheets

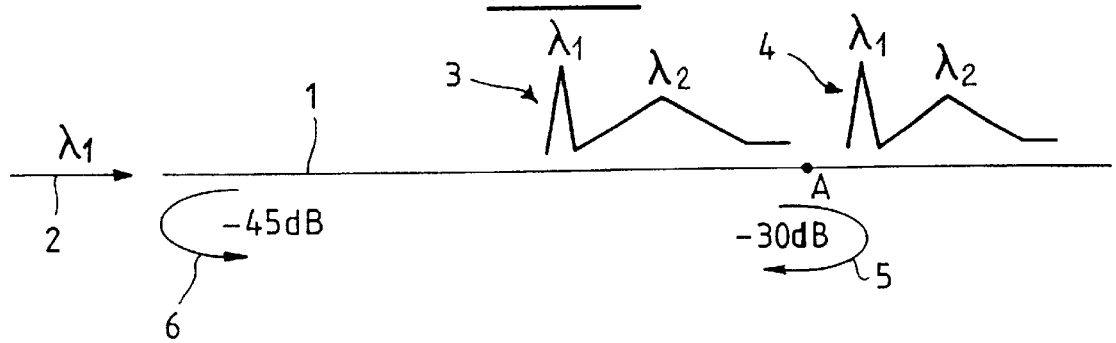
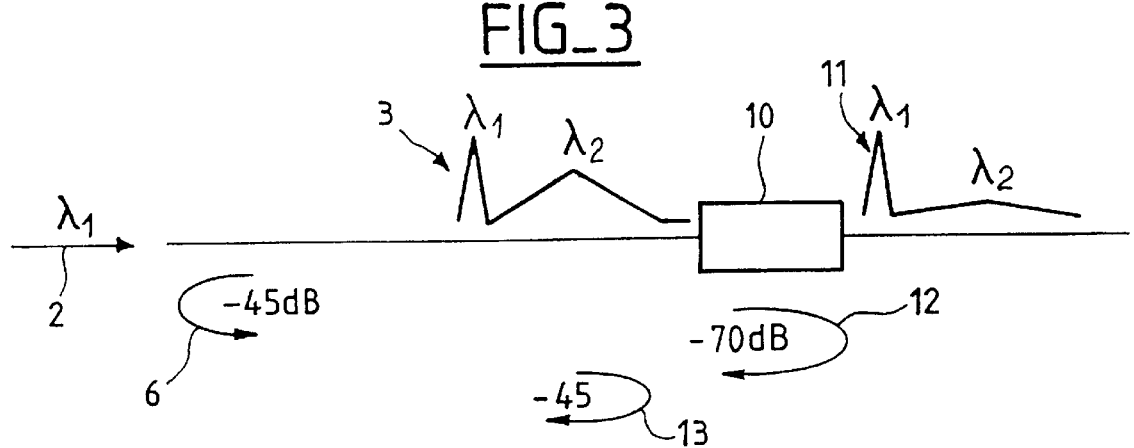
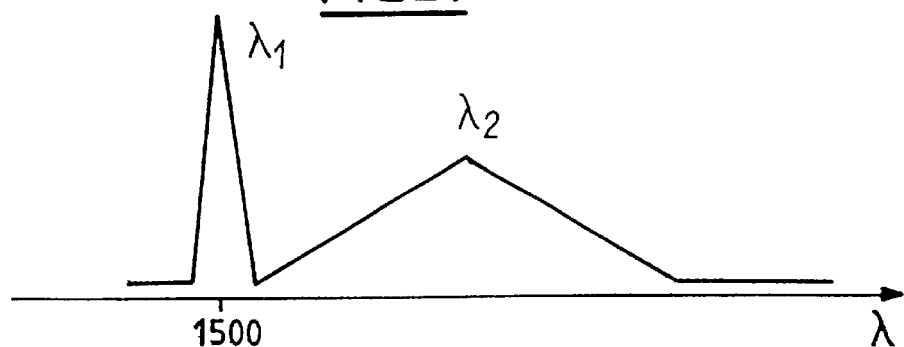

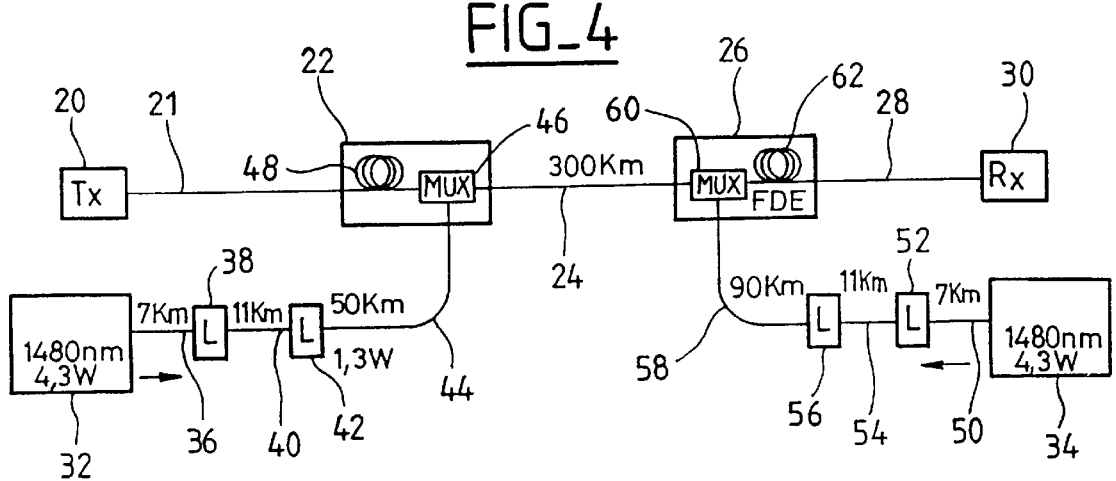
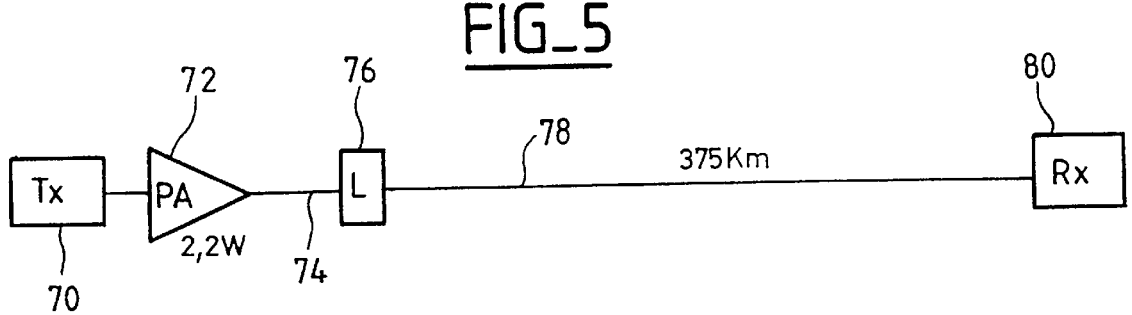
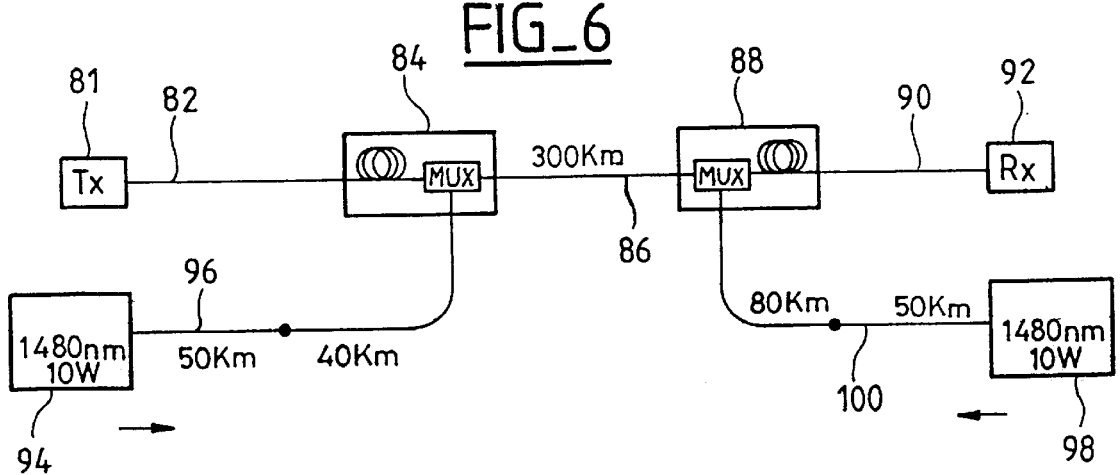

ELIMINATION OF OPTICAL POWER LIMITATION DUE TO STIMULATED RAMAN SCATTERING IN FIBER OPTIC LINKS

BACKGROUND OF THE INVENTION

1. Field of the invention

The present invention consists in a fiber optic link. The invention also concerns a transmission system comprising a link of the above kind. Finally, the invention concerns a method for pushing back the optical power limitation due to stimulated Raman scattering in an optical fiber link. The invention applies in particular to so-called "repeaterless" links. Such links are distinguished by the fact that electrically active components are used only in the terminal equipments.

2. Description of the Prior Art

Repeaterless fiber optic links have the particular feature of requiring injection of very high optical powers info the optical fiber to achieve great distances. Two types of optical waves are injected into the fiber. The first type is the signal wove at approximately 1 550 nm which is modulated and conveys the information to be transmitted. The second type of optical wave is the so-called pump wave in the wavelength range from 1 400 nm to 1 500 nm and which is a continuous power injected into the optical fiber in order to amplify the signal.

The pump wave can be used in many different ways. The pump wove can be sent from the sending terminal or from the receiving terminal. The scheme most widely used at present consists in placing a section of doped fiber in the link a few tens of kilometers from the terminal from which the pump wave is sent. The doped fiber is activated by the pump optical wave and amplifies the signal. The pump wave can be injected into the same optical fiber as that which carries the signal or into a separate optical fiber. The two techniques con be combined. If the signal and pump waves are on the same fiber, the pump wave amplifies the signal because of stimulated Raman scattering, which is beneficial up to a particular pump power level.

Increasing the range of the link requires using very high signal and pump powers (in the order of one Watt). However, the signal power and the pump power that can be injected are limited by various non-linear effects, in particular the Brillouin effect, the Kerr effect and stimulated Raman scattering. These effects are described in "Nonlinear Fibre Optics", G.P. Agrawal, Academic Press 1980.

Limitation by various non-linear effects is described in "The performance limits of unrepeatered systems", A. Hadjifotiou, Suboptic '93, Mar. 29–Apr. 2, 1993, Versailles, France; with reference to stimulated Raman scattering, this publication simply proposes a threshold value for the sending power corresponding to the value of the sending power for which the power frequency shifted because of stimulated Raman scattering (Stokes power) is equal to the power of the signal at the fiber exit.

A transmission system using Raman pre-amplifiers is described in "Rayleigh scattering limitations in distributed Raman pre-amplifiers", P. B. Hansen et al, OFC'97 technical digest, paper FA2, Dallas, February 1997. This publication calculates the limitation imposed by Rayleigh scattering in Raman pre-amplifiers.

The invention is based on the new discovery that the phenomenon limiting the injection of high optical powers is stimulated Raman scattering. For high injected signal or pump powers stimulated Raman scattering produces a very high gain in the fiber which, combined with Rayleigh tire reflections (intrinsic reflections of the fiber), cause power instabilities and oscillations that prevent transmission. This phenomenon also creates noise which is amplified to the detriment of the signal of the pump to be transmitted. This phenomenon is mentioned in the publication by A. Hadjifotiou mentioned above, along with other limitations on link performance; however, that publication merely proposes modeling of the corresponding power limit, does not specify if this is the limiting effect, and does not describe any solution to the limitation problem.

The invention proposes a solution to the problem of limitation of the optical power injected into fiber optic links; in particular, it caters for longer repeaterless links by enabling the injection of higher powers. Compared to currently possible commercial link lengths of 400 km or laboratory link lengths of 500 km, such as those described in "511 km at 2.5 Gbit/s and 531 km at 622 Mbit/s— Unrepeated Transmission with Remote pumped amplifiers, Forward Error Correction and Dispersion Compensation", S. S. Sian et al, the invention enables the length of the link to be extended by more than 80 km. In power terms, the pump powers currently injected are in the order of 1.3 W, as described for example in "Unrepeated WDM Transmission Experiment with 8 Channels of 10 Gb/s over 352 km", P. B. Hansen et al, IEEE Photonics Technology Letters, vol. 8 N° 8, August 1996; the invention enables injection of pump powers up to 10 W.

SUMMARY OF THE INVENTION

To be more precise, the invention proposes an optical fiber link including attenuator means in the wavelength region in which the sent signal creates the Raman gain.

The attenuator means are advantageously bidirectional.

They preferably also attenuate Rayleigh reflections in the wavelength region in which the sent signal creates the Raman gain.

In one embodiment, the attenuator means induce reflections in the link at a level less than −20 dB, preferably less than −40 dB at the maximum Raman gain wavelength.

In another embodiment, the attenuator means attenuate the maximum Raman gain wavelength at least 10 dB.

The attenuator means advantageously attenuate at a level less than 1 dB in the wavelength region of the sent signal.

The attenuator means can comprise one or more of the following: a section of optical fiber doped with materials that are more absorbent in the wavelength region in which the sent signal creates the Raman gain than in the wavelength region to be transmitted; filters attenuating in the wavelength region in which the sent signal creates the Raman gain; optical isolators.

In this case, these materials include rare earths such as terbium or dysprosium, for example. The concentration of rare earth in the fiber section is advantageously greater than 0.01 ppm.

In one embodiment, the attenuation per unit length in said fiber sections at the wavelength at which the sent signal creates the Raman gain is at least two times greater than the attenuation at the wavelength of the sent signal.

Localized attenuator means can also be provided at at least one point of the link, the total length of the attenuator means being less than 10% of the total length of the link.

Distributed attenuator means can be provided in the link, the total length of the attenuator means being in the range 10% to 100% of the total length of the link.

In one embodiment, the attenuator means in the Raman gain region are placed at locations of the link such that at any point of the link the cumulative Raman gain value from the end of the link or from other attenuator means is less than a limit value.

The limit value preferably depends on reflections in the link.

In another embodiment, attenuator means in the Raman gain region are used to transmit high transmission signal wave powers in the wavelength range 1 520 nm to 1 580 nm or high pump wave powers in the wavelength range 1 400 nm to 1 500 nm.

A plurality of attenuator means can be provided.

The invention also concerns a transmission system comprising at least one such link.

The invention finally concerns a method of transmitting high-power optical signals in a fiber optic link including at least one step of attenuation in the region of the wavelength at which the sent signal creates the Raman gain.

In one embodiment, the attenuation step comprises attenuation in both propagation directions on the link.

A step of attenuating Rayleigh reflections in the wavelength region in which the sent signal creates the Raman gain can also be provided.

The attenuation step advantageously comprises an attenuation of at least 10 dB at the maximum Raman gain wavelength.

The attenuation step preferably induces an attenuation at a level less than 1 dB in the wavelength region of the sent signal.

In one embodiment, the attenuation step comprises one or more of the following steps: propagation through sections of optical fiber doped with materials absorbing more in the wavelength region in which the sent signal creates the Raman gain than in the region of the wavelength to be transmitted; filtering using attenuating filters in the wavelength region in which the sent signal creates the Raman gain; reflection by optical isolators.

In the above cases the materials can include rare earths such as terbium or dysprosium. The rare earth concentration in the fiber section is then preferably greater than 0.01 ppm.

In one embodiment, the attenuation per unit length in said fiber sections at the wavelength at which the sent signal creates the Raman gain is at least twice the attenuation at the wavelength of the sent signal.

The attenuation step can be effected in a localized manner at at least one point of the link or in a distributed manner along the link, over a length in the range 10% to 100% of the total length of the link.

The attenuation step is advantageously effected in the link so that at any point of the link the cumulative Raman gain value is less than a limit value. The limit value is preferably dependent on reflections in the link.

A plurality of attenuation steps is advantageously provided.

Other features and advantages of the invention will become apparent on reading the following description of various embodiments of the invention given by way of example only and with reference to the drawings.

BRIEF DESCRIPTION OF THE DRAWINGS

FIG. 1 shows the approximate spectrum of the noise and of the Raman gain coefficient corresponding to a wave sent at the wavelength $\lambda 1$ in the 1 500 nm region.

FIG. 2 shows a conventional link with the powers of various signals.

FIG. 3 shows a link provided with attenuator means in accordance with the invention.

FIG. 4 shows a link in accordance with the invention with localized attenuator means on the pump fiber.

FIG. 5 shows a link in accordance with the invention with localized attenuator means on the line fiber.

FIG. 6 shows a link in accordance with the invention with distributed attenuator means on the line fiber.

DETAILED DESCRIPTION OF THE PREFERRED EMBODIMENTS

The remainder of this application considers embodiments of the invention for various types of optical fiber conventionally used; the invention is not limited to these wavelength values or to these optical fiber types.

Stimulated Raman scattering occurs in all optical fibers and is manifested by the appearance of gain and noise at wavelengths greater than the injected wavelength. FIG. 1 shows the approximate spectrum of the noise and of the Raman gain coefficient corresponding to a wave sent at the wavelength $\lambda 1$ in the 1 500 nm region.

The spectrum of the gain coefficient as a function of the wavelength is, broadly speaking, a triangle with a wavelength maximum approximately 100 nm higher when the injected wave is in the 1 500 nm region. The wavelength region in which the Raman gain is manifested extends approximately 200 nm from the injected wave, with a gain maximum approximately 100 nm higher, as shown in FIG. 1. In FIG. 1 the wavelength is plotted on the horizontal axis and the power on the vertical axis. FIG. 1 shows the injected wave with a peak around 1 500 nm and the Raman gain, which is triangular in shape, at wavelengths higher than that of the injected wave.

For example, in the case of injecting a pump wave at 1 480 nm with a power greater than 1.3 W in a standard fiber, stimulated Raman scattering produces a high gain the 1 580 nm region and oscillations begin to appear towards 1 580 nm. This phenomenon causes instabilities in the power transmitted at 1 480 nm and, the greater the power, the more the energy of the 1 480 nm wave is transferred towards 1 580 nm.

In the case of high signal powers, the fiber used is of a different type, to avoid the consequences of the Kerr effect, and the limitation occurs for approximately 1 W of injected signal. This time stimulated Raman scattering creates gain at 1 650 nm and the laser oscillations caused at this wavelength cause instabilities at 1 550 nm and remove energy from the signal at 1 550 nm.

The invention proposes to push bock the limitation due to stimulated Raman scattering to enable higher powers to be injected into the fiber to increase link range. To this end the invention proposes to introduce into the link attenuator means in the wavelength region in which the sent signal creates the Raman gain. Such attenuator means prevent the conditions for oscillation in the Raman gain region from being satisfied and limit the accumulation of noise in the Raman gain region. As a result, the accumulated noise is not amplified to the detriment of the signal or of the pump to be transmitted. The features or the effects of the attenuator means are described in more detail hereinafter.

The attenuator means are advantageously bidirectional in the Raman gain region. This avoids the generation of Raman noise in both propagation directions and attenuates Rayleigh type reflections.

Various implementations are possible: localized solutions which consist in adding elements into the link, distributed solutions which consist in modifying the line fiber, and hybrid solutions known as quasi-localized solutions. FIGS. 2 through 5 show localized solutions; FIG. 6 shows a distributed solution.

FIGS. 2 and 3 illustrate the possible characteristics of attenuator means in accordance with the invention. FIG. 2 shows a conventional link with the powers of the various signals; a signal at a wavelength λ1, for example 1 480 nm, is injected into a line fiber 1, as symbolized by the arrow 2. Propagation of the signal in the fiber indices stimulated Raman scattering around a wavelength λ2, in this case 1 580 nm, as explained above. On either side of a point A of the link there are spectra 3 and 4 which take the form of that from FIG. 1, as shown in FIG. 2. The arrow 5 symbolizes Rayleigh reflections in the fiber which propagate in a direction opposite to the propagation of the signal at λ1, and at a power in the order of −30 dB relative to the injected signal. The arrow 6 symbolizes the various reflections that propagate in the same direction as the signal at λ1, and at a relative power in the order of −45 dB.

FIG. 3 shows a link provided with attenuator means in accordance with the invention. Localized attenuator means 10 are disposed at point A in the link from FIG. 2, examples of such means are described below. The attenuator means attenuate the signals in the wavelength region in which the sent signal creates the Raman gain, i.e. in the FIG. 2 example around 1 580 nm. The spectrum 3 on the input side of the attenuator means is identical to that shown in FIG. 2; on the other hand, downstream of the limiter means, the power of the signal in the wavelength region around 1 580 nm is attenuated; the spectrum 11 downstream of the limiter means therefore has a power peak at λ1=1 480 nm and an attenuated power in the wavelength region in which the signal at λ1 creates the Raman gain. A typical value of the attenuation induced by the attenuator means around λ2 is 20 dB. Other possible values will become apparent on reading the remainder of the description.

The attenuator means 10 also attenuate Rayleigh reflections; in the case of bidirectional attenuators, for 20 dB of attenuation at λ2 the Rayleigh reflections on the output side of the limiter means have a power in the order of −70 dB, as indicated on the arrow 1 2 in FIG. 3; compared to the value of −30 dB of FIG. 2, this value allows for the attenuation induced by two passes through the attenuator means, 11. For a monodirectional attenuator there would be a Rayleigh reflection power in the order of −50 dB.

The attenuator means advantageously induce little reflection; in the FIG. 3 example, as symbolized by the arrow 13, the attenuator means induce a reflection of only −45 dB.

The presence of the attenuator means 11 avoids the generation of Raman noise, limits Rayleigh type reflections and globally increases the injected power and the range of the link.

The nature of the attenuator means that can be used to implement the invention will now be described in more detail. The attenuator means can comprise filters that pass the signal to be transmitted but reject wavelengths in the Raman gain region, for example. Various filter technologies can be used, for example fusion-selective wavelength stretching couplers, Bragg filters, dielectric filters, wavelength-selective mode filters. If the filters chosen cause reflections in the Raman gain region they are advantageously combined with optical isolators to reduce reflections in the wavelength region in which the sent signal creates the Raman gain.

The attenuator means con also be sections of optical fiber doped with elements that absorb more in the Raman gain region than at the wavelength to be transmitted. These optical fiber sections can be in localized units or integrated into the cable (quasi-localized solutions). For example, these special fiber sections can be sections of optical fiber doped with dysprosium. The absorption of this rare earth increases rapidly with wavelengths from around 1 480 nm. It can therefore be used to attenuate more in the Raman gain region than at the transmitted wavelength.

The attenuation induced by the attenuator means for the wavelength at which the sent signal creates a maximum Raman gain is preferably greater than or equal to 10 dB. In the example shown in FIGS. 2 and 3 it is 20 dB; it can be even higher.

The attenuator means induce as little attenuation as possible in the wavelength region of the sent signal. In the FIG. 4 example this attenuation is 0.8 dB; it is advantageously less than 0.2 dB.

The region in which the attenuator means attenuate the signal is preferably as close as possible to the wavelength of the sent signal; when there are no attenuator means, an oscillation effect would occur at the maximum gain, i.e. for λ2 using the FIG. 3 notation. When attenuator means are present, oscillation will occur for higher send powers and at the wavelengths at which the combination of the Raman gain and the attenuation is most favorable for the development of the Raman gain and noise. It is therefore preferable for the attenuation to be significant, not only for the wavelength for which the Raman gain created is maximum in the absence of attenuator means but also in the wavelength region around that wavelength. For example, a wavelength λc of the attenuator can be defined for which the attenuation is 20 dB greater than at λ1. The closer the wavelength λc is to λ1, the higher the maximum power that can be sent; λc advantageously satisfies the condition λc≤λ1+10 nm. The attenuation is in fact advantageously significant as close as possible to the wavelength to be transported.

Possible positions for the attenuator means will now be indicated. In the case of localized solutions, the attenuator means in the Raman gain region can be localized near ends of the link where high powers propagate. One possible rule for disposing the attenuator means is as follows. Attenuator means can be inserted when the cumulative Raman gain from the beginning of the link or from the preceding attenuator means is greater than a limit gain value. An optical fiber section between the beginning of the link and the first attenuator means or between two adjacent attenuator means is called a Raman elementary section. The gain limit depends on reflections either side of the Raman elementary section. If a reflection value of −45 dB is achieved, a limit value of 40 dB for the Raman gain in an elementary section can be considered, which provides a 5 dB margin. The limit value in question can be an absolute value—for example 40 dB—or a relative value—for example 5 dB above the reflection value.

With an arrangement of the above kind attenuator means are placed so that, without them, the gain created by stimulated Raman scattering combined with reflections in the system, including Rayleigh type reflections, would cause power instabilities and the transfer of energy of the wave to be transmitted toward the Raman gain region.

FIG. 4 shows one example of a link in accordance with the invention, with localized attenuator means, enabling the power of the pump signal to be increased. The FIG. 4 link includes a sender 20 which sends on a line fiber 21 a signal at a wavelength around 1 480 nm. After 68 km of propagation, the end of the line fiber is connected to a first remote amplifier 22. The signal from the remote amplifier propagates over 300 km of line fiber 24 and reaches a second remote amplifier 26; it is then transmitted over a line fiber 28 to the receiver 30, over a length of 108 km. The distances in these examples are distances that could be used for commercially installed systems. For laboratory demonstration systems greater distances could be installed.

In the present example, the pump power is injected from the send terminal and towards the receive terminal, from send and receive end pump generators 32 and 34 which send continuous optical signals at a power of 4.3 W. The fibers that transport the pump are different from that which transports the signal so that the loss of the limiters does not affect the signal. Two Raman elementary sections are considered and two Raman limiters are used at each end of the link. Accordingly the send end generator 32 sends the pump signal in a first fiber section 36 with a length of 7 km; this first section is connected to attenuator means 38; the attenuated pump signal is transmitted over a second fiber section 40 having a length of 11 km to second attenuator means 42. The pump signal is then transmitted by a third fiber section 44 having a length of 50 km to the first remote amplifier 22. In this amplifier the pump signal and the signal to be transported are multiplexed in a multiplexer 46 and the pump signal is used to amplify the signal to be transported in a fiber section 48 doped with erbium. The receiving end arrangements are substantially identical: generator 34, first fiber section 50 having a length of 7 km; attenuator means 52; second fiber section 54 having a length of 11 km; second attenuator means 56; third fiber section 58 having a length of 90 km, second remote amplifier 24. The remote amplifier 24 comprises a multiplexer 60 and a fiber section 62 doped with erbium.

In the FIG. 4 arrangement, the Raman attenuator means attenuate by 0.8 dB at 1 480 nm, more than 20 dB at wavelengths greater than 1 490 nm and create less than −45 dB reflections. Given the above conditions, the length of the elementary sections is calculated so that the Raman gain generated in a section does not exceed 40 dB. The elementary section near the sending terminal is the shortest because the pump power is highest here. The power injected into the line from the second attenuator means is 1.3 W which is the maximum that can be injected without risk of oscillation in the absence of attenuator means. What is more, with this power, there is little conversion from the pump at 1 480 nm to noise at 1 580 nm (20 dB difference).

Using higher powers and third Raman attenuator means would extend the distance by only a few km and is not considered in the present example. In total, with two attenuator means in accordance with the invention at each end of the link, the increase in distance is 18 km at each end, i.e. 36 km in total.

FIG. 5 shows another example of a link in accordance with the invention with localized attenuator means to enable propagation of a very high signal power at 1 550 nm. The FIG. 5 link includes a sender 70, a post-amplifier 72, an 11 km fiber section 74, limiter means 76, 375 km of line fiber 78 and a receiver 80. In the present example the attenuator means have a loss of 0.8 dB at 1 550 nm and attenuate more than 20 dB at wavelengths higher than 1 560 nm. In FIG. 5 the attenuator means are placed on the fiber that carries the signal to be transmitted and the loss of the attenuator means for the wavelength of the signal to be transmitted must be subtracted from the increase in distance. For this reason, attenuator means increase the distance only 7 km (11 km as shown in FIG. 4, less 4 km corresponding to the loss of the attenuator means at the wavelength of the signal to be transmitted) and second Raman attenuator means, which will provide only 2 km of additional length, are not considered in the present example.

Accordingly, the invention increases the injected power and the range of the link using simple attenuator means on the line fiber or on the pump fiber.

FIG. 6 shows a link in accordance with the invention with distributed attenuator means on the line fiber. A distributed solution of this kind consists in using an optical fiber that attenuates more in the Raman gain region than at the wavelength to be transmitted. Accordingly the fiber intrinsically prevents generation of Raman noise and also has very little Rayleigh reflection in the Raman gain region. This differential attenuation can be obtained by doping the line fiber with a material absorbing more in the Raman gain region than at the wavelength to be transmitted. In the FIG. 6 example a special fiber of the above kind is used to transport the pump signal to the remote amplifiers.

The structure of the FIG. 6 link is similar to that of FIG. 4. The FIG. 6 link comprises a sender 81 which sends on a standard fiber 82 a signal at a wavelength around 1 480 nm. After 90 km of propagation, the end of the fiber 82 is connected to a first remote amplifier 84. The signal output by the remote amplifier propagates over 300 km of standard fiber 86 and reaches a second remote amplifier 88; it is then transmitted over a standard fiber 90 to the receiver 92, over a length of 130 km.

The pump signal is injected at the sending end by a pump generator 94 towards a 50 km doped fiber section 96 that forms first distributed attenuator means. The end of the fiber section 96 is connected to a 30 km standard fiber in turn connected to the first remote amplifier. This has a structure analogous to the remote amplifier from FIG. 4 and is not described in more detail. At the receiving end the structure is similar: pump generator 98, 50 km doped fiber section 100, 80 km of standard fiber, the end of which is connected to the second remote amplifier 88.

In the present example, a fiber doped with dysprosium is used to transport the pump signal in the first tens of km in which the signal to be transmitted is powerful. Dysprosium $Dy^{3+}$ absorbs little at 1 480 nm—the wavelength of the pump signal—but strongly absorbs higher wavelengths, in particular 1 580 nm. As the required dysprosium concentration is low, attenuation at 1 480 nm cannot be significantly increased by adding dysprosium. Accordingly, if the attenuation at 1 480 nm remains equal to 0.21 dB/km, as for a standard fiber, but increases to 0.3 dB/km at 1 530 nm and to 1 dB/km at the Raman gain peak at 1 580 nm, the maximum pump power that can be injected rises from 1.3 W to approximately 10 W, which represents an additional distance of 40 km at each end, i.e. 80 km in total. This time the limitation is no longer due to oscillation at 1 580 nm, but to oscillation at 1 530 km, at which the combination of the Raman gain and attenuation is most favorable to generation of the Raman gain and noise. Dysprosium or another rare earth such as terbium is typically used, at a concentration greater than 0.01 ppm. A concentration of this order of magnitude is sufficient to attenuate the signal at the wavelength at which the sent signal creates the Raman gain by at least twice the attenuation at the wavelength of the sent signal.

The FIG. 6 solution is one example of distributed attenuator means. The length of doped fiber is sufficient for the power at the exit from the doped fiber section to be less than 1.3 W, which power can be injected into the standard fiber.

Distributed attenuator means like those from FIG. 6 could also be applied to the FIG. 4 example. Doped fiber sections could then be used for the attenuator means from FIG. 4 or FIG. 5, as in FIG. 6. In the case of a localized or quasi-localized solution, one or more attenuator means can be provided, the total length of which is preferably less than 10% of the total length of the link. The total length of the link is defined as the total length of the cable consisting of the cable itself and the joint boxes; in the case of a distributed solution the length of fiber sections attenuating the signal can be in the range from 10% to 100% of the length of the link. The distances used in the FIGS. 4, 5 and 6 examples are distances corresponding to systems that could be installed. Longer systems could be feasible in the context of laboratory demonstrations.

There is claimed:

1. A fiber optic link including an attenuator in the wavelength region in which a sent signal creates Raman gain, wherein said attenuator also attenuates Rayleigh reflections in the wavelength region in which said sent signal creates Raman gain.

2. A link as claimed in claim 1, wherein the attenuator attenuates the wavelength region in which the sent signal creates Raman gain without absorbing it.

3. A link as claimed in claim 1 wherein said attenuator is bidirectional.

4. A link as claimed in claim 1 wherein said attenuator induces reflections in said link at a level less than −20 dB, preferably less than −40 dB, at a maximum Raman gain wavelength.

5. A link as claimed in claim 1 wherein said attenuator attenuates in the wavelength region of said sent signal at a level less than 1 dB.

6. A link as claimed in claim 1 wherein said attenuator comprises one or more of the following: optical fiber sections doped with materials absorbing more in the wavelength region in which said sent signal creates Raman gain than in the region of the wavelength to be transmitted; filters attenuating in the wavelength region in which said sent signal creates Raman gain; optical isolators.

7. A link as claimed in claim 6, wherein said materials comprise rare earth elements.

8. A link as claimed in claim 7 wherein the rare earth concentration in the fiber sections is greater than 0.01 ppm.

9. A link as claimed in claim 7, wherein said rare earth elements are selected from the group consisting of terbium and dysprosium.

10. A link as claimed in claim 6, wherein an attenuation per unit length in said fiber sections at the wavelength at which said sent signal creates Raman gain is at least twice the attenuation at the wavelength of said sent signal.

11. A link as claimed in claim 1 wherein said attenuator is localized at at least one point of said link, the total length of said attenuator being less than 10% of the total length of said link.

12. A link as claimed in claim 1 comprising a plurality of attenuators distributed in said link, the total length of the attenuators being in the range 10% to 100% of the total length of said link.

13. A link as claimed in claim 1, wherein said attenuator in said Raman gain region is placed at a location of said link such that at any point of said link the cumulative Raman gain value from the end of said link or from another attenuator is less than a limit value below which oscillation in said Raman gain region is prevented.

14. A link as claimed in claim 13 wherein said limit value depends on reflections in said link.

15. A link as claimed in claim 1, wherein said attenuator in the Raman gain region is used to transmit high transmission signal wave powers in the wavelength range 1520 nm to 1580 nm or high pump wave powers in the wavelength range 1400 nm to 1500 nm.

16. A link as claimed in claim 1 comprising a plurality of attenuators.

17. A transmission system comprising at least one link as claimed in claim 1.

18. A fiber optic link for transmitting a signal in a first wavelength region, said signal creating Raman gain in a second wavelength region, said link comprising an attenuator in the second wavelength region for attenuating light transmitted in the second wavelength region,
wherein said attenuator attenuates by at least 10 dB at a maximum Raman gain wavelength, and
wherein said attenuator also attenuates Rayleigh reflections in the wavelength region in which said sent signal creates Raman gain.

19. A method of transmitting high-power optical signals in a fiber optic link including at least one step of attenuation in the wavelength region in which a sent signal creates Raman gain, and further including a step of attenuating Rayleigh reflections in the wavelength region in which said sent signal creates Raman gain.

20. A method as claimed in claim 19 wherein said at least one step of attenuation attenuates the wavelength region in which the sent signal creates Raman gain without absorbing it.

21. A method as claimed in claim 19 wherein said attenuation step comprises attenuation in both propagation directions on said link.

22. A method as claimed in claim 19, wherein said at least one step of attenuation induces in the wavelength region of said sent signal attenuation at a level less than 1 dB.

23. A method as claimed in claim 19, wherein said at least one step of attenuation comprises one or more of the following steps: propagation through optical fiber sections doped with materials absorbing more in the wavelength region in which said sent signal creates Raman gain than in the region of the wavelength to be transmitted; filtering using filters attenuating in said wavelength region in which said sent signal creates Raman gain; reflection by optical isolators.

24. A method as claimed in claim 23, wherein said materials comprise rare earth elements.

25. A method as claimed in claim 24 wherein the rare earth concentration in said fiber section is greater than 0.01 ppm.

26. A method as claimed in claim 24, wherein said rare earth elements are selected from the group consisting of terbium and dysprosium.

27. A method as claimed in claim 23, wherein an attenuation per unit length in said fiber section at the wavelength at which said sent signal creates Raman gain is at least twice the attenuation at the wavelength of said sent signal.

28. A method as claimed in claim 19, wherein said at least one step of attenuation is effected in a localized manner at at least one point of said link.

29. A method as claimed in claim 19, wherein said at least one step of attenuation is effected in a distributed manner along said link over a length in the range 10% to 100% length of the total length of said link.

30. A method as claimed in claim 19, wherein said at least one step of attenuation is effected in said link so that at any point of the link the cumulative Raman gain value is less than a limit value below which oscillation in said Raman gain region is prevented.

31. A method as claimed in claim 30 wherein said limit value depends on reflections in said link.

32. A method as claimed in claim 19 comprising a plurality of attenuation steps.

33. A method of transmitting high-power optical signals in a first wavelength region of a fiber optic link, the high-power optical signals creating Raman gain in a second wavelength region, comprising at least one step of attenuating light transmitted in the second wavelength region, wherein said at least one step of attenuation comprises attenuation of at least 10 dB at a maximum Raman gain wavelength, and further including a step of attenuating Rayleigh reflections in the wavelength region in which said sent signal creates Raman gain.

* * * * *